(12) United States Patent
Jacobs et al.

(10) Patent No.: US 10,013,172 B2
(45) Date of Patent: Jul. 3, 2018

(54) ELECTRONIC DATA STORAGE DEVICE WITH MULTIPLE CONFIGURABLE DATA STORAGE MEDIUMS

(71) Applicant: The KEYW Corporation, Hanover, MD (US)

(72) Inventors: Jordan Spencer Jacobs, Orlando, FL (US); Joseph Andrew Hock, Orlando, FL (US)

(73) Assignee: THE KEYW CORPORATIN, Hanover, MD (US)

( * ) Notice: Subject to any disclaimer, the term of this patent is extended or adjusted under 35 U.S.C. 154(b) by 243 days.

(21) Appl. No.: 14/796,740

(22) Filed: Jul. 10, 2015

(65) Prior Publication Data

US 2017/0010808 A1    Jan. 12, 2017

(51) Int. Cl.
G06F 13/40    (2006.01)
G06F 13/38    (2006.01)
G06F 13/12    (2006.01)
G06F 3/06     (2006.01)
G06F 13/42    (2006.01)

(52) U.S. Cl.
CPC .............. *G06F 3/061* (2013.01); *G06F 3/065* (2013.01); *G06F 3/0619* (2013.01); *G06F 3/0665* (2013.01); *G06F 3/0685* (2013.01); *G06F 13/4081* (2013.01); *G06F 13/4282* (2013.01)

(58) Field of Classification Search
None
See application file for complete search history.

(56) References Cited

U.S. PATENT DOCUMENTS

| | | |
|---|---|---|
| 5,513,069 A | 4/1996 | Ohgami et al. |
| 6,918,174 B2 | 7/2005 | Kim et al. |
| 8,358,499 B2 | 1/2013 | Jacobs et al. |
| 2003/0109218 A1 | 6/2003 | Pourkeramati et al. |
| 2006/0010458 A1* | 1/2006 | Georgis ............ G11B 23/0303 720/600 |
| 2007/0214331 A1 | 9/2007 | Murphy |
| 2008/0005595 A1 | 1/2008 | Spengler et al. |
| 2011/0004840 A1* | 1/2011 | Feinberg ................. G06F 9/445 715/772 |
| 2011/0059772 A1 | 3/2011 | Want et al. |
| 2011/0085294 A1 | 4/2011 | Jacobs et al. |
| 2012/0139671 A1 | 6/2012 | Gilmore |
| 2012/0239944 A1 | 9/2012 | Goodman et al. |
| 2012/0284354 A1 | 11/2012 | Mukundan et al. |
| 2013/0268758 A1 | 10/2013 | Schrecker |
| 2014/0334089 A1 | 11/2014 | Schade |

OTHER PUBLICATIONS

PCT Application No. PCT/US2016/041541, International Search Report and Written Opinion, dated Dec. 15, 2016, 11 pages.

* cited by examiner

*Primary Examiner* — David E Martinez
(74) *Attorney, Agent, or Firm* — Lathrop Gage L.L.P.

(57) ABSTRACT

An electronic data storage device includes a single outer case enclosing a plurality of individually isolated data storage mediums. The outer case may appear to be an industry standard single data storage device, however the plurality of data storage mediums are accessible therein. The electronic data storage device may include a wireless receiver paired to a wireless controller for selecting the accessible data storage medium. The electronic data storage medium may include a processor configured with firmware for enabling tamper protection and/or large volume management protocols.

44 Claims, 6 Drawing Sheets

ELECTRONIC DATA STORAGE DEVICE WITH MULTIPLE CONFIGURABLE DATA STORAGE MEDIUMS

BACKGROUND

Information processing systems, such as laptop computers, tablets, desktop computers, etc., require data storage mediums for storing the software and associated data to operate. These data storage mediums are typically referred to as a hard drive or hard disk drive (HDD). Conventional hard drives typically include a sealed aluminum box that has a filtered air-vent. Inside the box of a conventional hard drive are electronics that direct a read/write head or heads held aloft by a spindle arm and control the motor which rotates magnetic medium platters ("hard disks"). The hard drive's driver electronics contain the instructions for recording data onto the hard disks and for translating magnetic patterns into bytes when data is requested by the CPU.

Recent technology in the data storage medium has resulted in a new type of drive, called a solid-state drive (SSD). SSDs, unlike HDDs do not require a magnetic disk, but instead utilize integrated circuit assemblies as memory to store data. The read/write speeds of SSDs are much faster than HDDs, and their physical size is much smaller.

Conventional computer architecture has one or more data storage mediums which a user can access at any given time. The user can see each of the data storage mediums through the interface of the operating system running on the information processing system. Even if there are multiple data storage drives in a single given computer, each drive is typically accessible by the user. This architecture may be undesirable in certain circumstances. For example, certain data may contain sensitive material and a user may want to prevent other users from having access thereto. And each individual disk drive is typically visible by simply viewing the internal configuration of the computer or via a scanning device, such as X-ray. Thus, the presence of a storage medium, and sometimes its contents, is typically easily identified.

SUMMARY OF THE INVENTION

In one embodiment, an electronic data storage device having multiple configurable data storage mediums includes an outer casing with a form factor configured to mount within an information processing system; two or more data storage mediums located within the outer casing, each of the data storage mediums being physically and electronically isolated from each other of the data storage mediums; a processor configured to control operation of each of the data storage mediums such that the information processing system has access to an activated one of the data storage mediums at a given moment; and, a wireless receiver, coupled with the processor, for receiving a signal from a wireless controller to identify the activated one of the data storage mediums.

In another embodiment, an electronic data storage device having multiple configurable data storage mediums includes: an outer casing with a form factor configured to mount within an information processing system; two or more data storage mediums located within the outer casing, each of the data storage mediums being physically and electronically isolated from each other of the data storage mediums; a processor configured to control operation of each of the data storage mediums such that the information processing system has access to an activated one of the data storage mediums at a given moment; wherein the form factor is configured to a first industry standard such that the number of data storage mediums is not apparent upon inspection of the electronic data storage device.

In still another embodiment, an electronic data storage device having multiple configurable data storage mediums includes an outer casing, a plurality of data storage mediums located within the outer casing, and a processor configured to control operation of each of the data storage mediums such that the information processing system has access to an activated one of the data storage mediums at a given moment. The outer casing has a form factor configured to mount within an information processing system, and the form factor is configured to a first industry standard. Each of the data storage mediums is physically and electronically isolated from each other of the data storage mediums, and each of the data storage mediums is configured to a second industry standard different from the first industry standard such that the number of data storage mediums is not apparent from the outer casing form factor.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
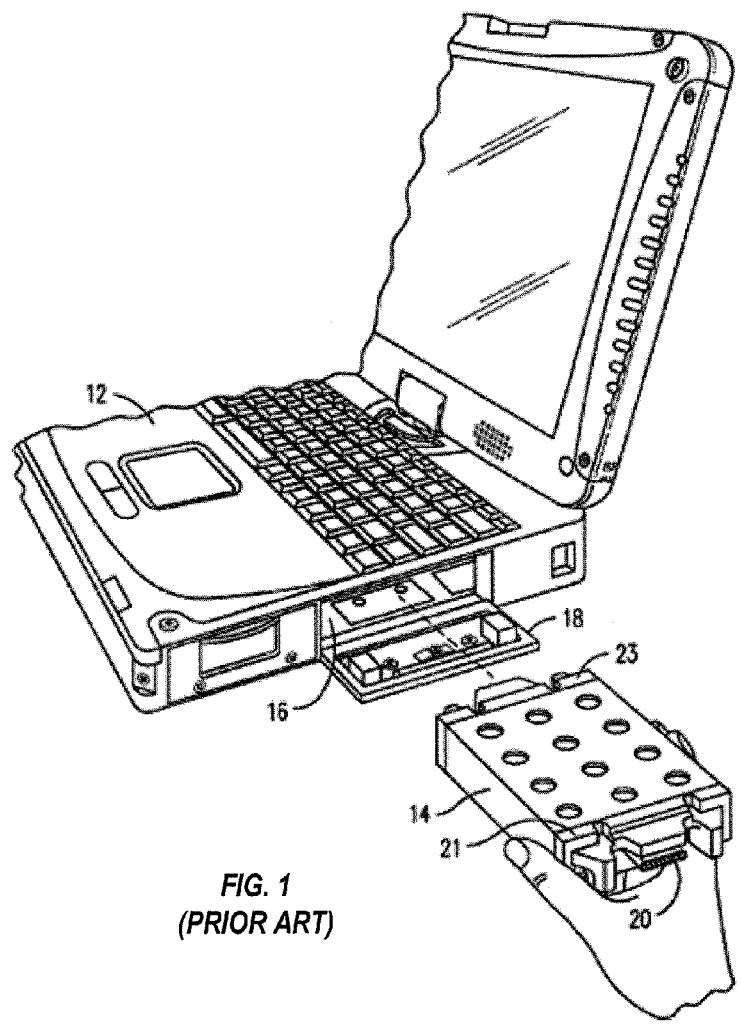
FIG. 1 depicts a prior art data storage module for insertion into an associated information processor having a bay accessible by bay door.
Figure 2:
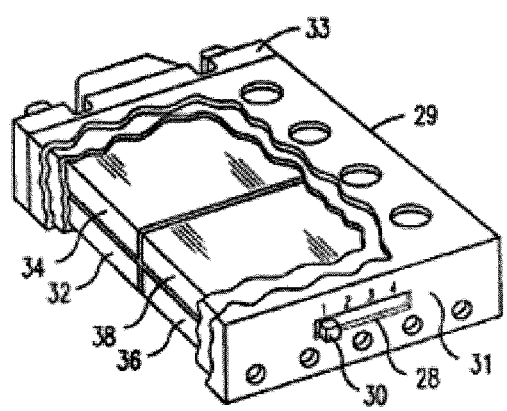
FIG. 2 depicts an alternative prior art data storage module having a single jack on end and a slide switch on end.

FIG. 1 depicts a prior art data storage module 14 for insertion into an associated information processor 12 having a bay 16 accessible by bay door 18. Data storage module 14 has two ends 21 and 23 each having an associated jack 20. Inside data storage module 14 are two data storage medium components that are isolated from each other. FIG. 2 depicts an alternative prior art data storage module 29 having a single jack on end 33 and a slide switch 28 on end 31. Data storage module 29 includes four data storage medium components 32, 34, 36, and 38. To activate one of the data storage medium components 32, 34, 36, or 38, a user manually manipulates actuator 30 of slide switch 28 to the desired position.

Inspection, either visual or scanning (e.g. via X-ray), of each of data storage modules 14 and 29 indicates that there are more than one data storage medium located within the data storage module. For example, with respect to data storage module 14, visual inspection shows that there are two jacks 20 respectively located on each end 21, 23. This indicates that alternate insertion orientations provide access to each data storage medium component therein. With respect to data storage module 29, the slide switch 28 indicates that there are four data storage medium components therein.

Furthermore, activating a given one of the data storage medium components within data storage modules 14 and 29 requires physical access to the module. For example, with respect to data storage module 14, a user physically accesses bay 16 via bay door 18 and flips the orientation of the module 14 to select the desired data storage medium component therein. With respect to data storage module 29, the user physically accesses bay 16 via bay door 18 and manually shifts actuator 30 to the desired position.

Thus, the data storage modules disclosed herein provide significant advantages to the prior art. In certain embodiments, the herein disclosed data storage modules are accessible via a wireless controller such that physical access to the data storage module is not required for activating a given data storage medium component therein. Moreover, certain embodiments of the herein disclosed data storage modules have an outer casing that has a physical form factor that is of an industry standard for single storage modules. Thus, upon visual inspection of the data storage module, or X-ray scanning of the information processing system housing the data storage module, one would not readily discern that the data storage module includes more than one data storage medium component therein. Additionally, the data management techniques, such as large volume management of the data storage components, provide significant advantages of decreased latency and increased data protection, as will be discussed in further detail below. Additional advantages will be apparent to those of ordinary skill in the art based on the discussion below.

Figure 3:
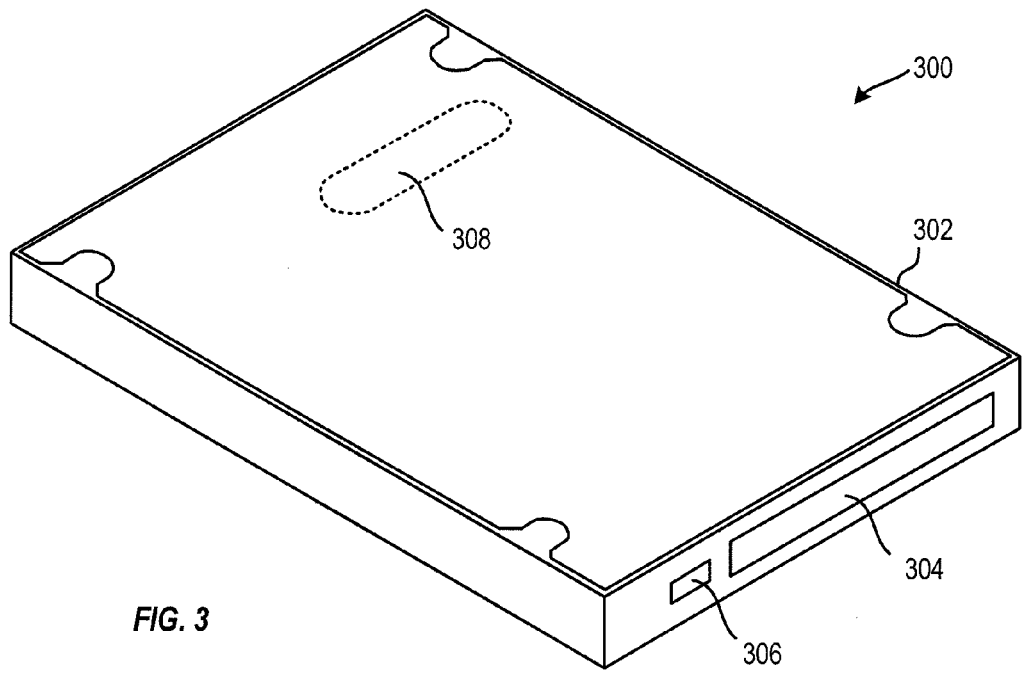
FIG. 3 depicts a perspective view of a data storage module having an outer casing, a data port, a configuration port, and a drive select interface in one embodiment.
Figure 4:
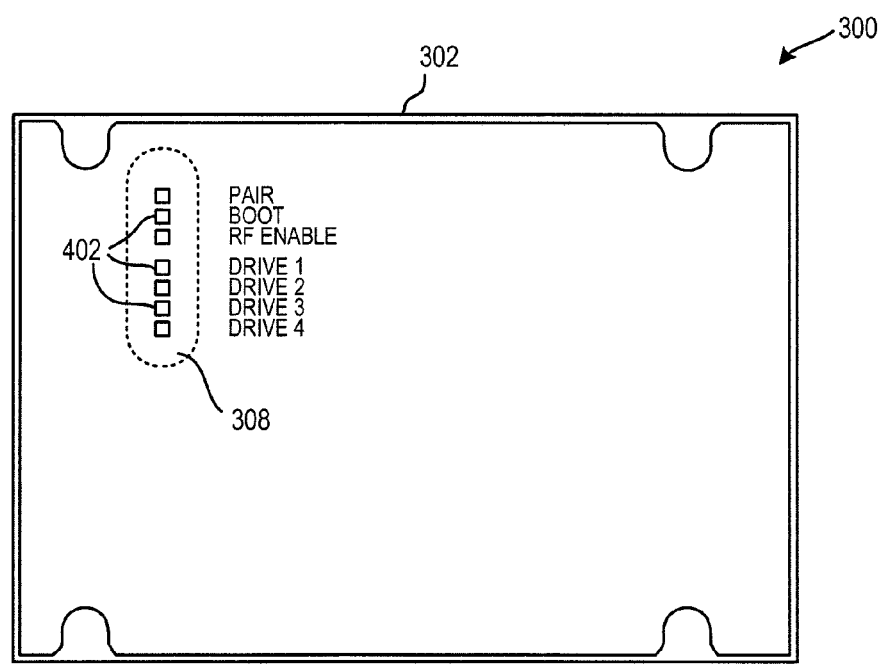
FIG. 4 depicts a top view of the data storage module of FIG. 3, further showing optional drive select interface in more detail.
Figure 5:
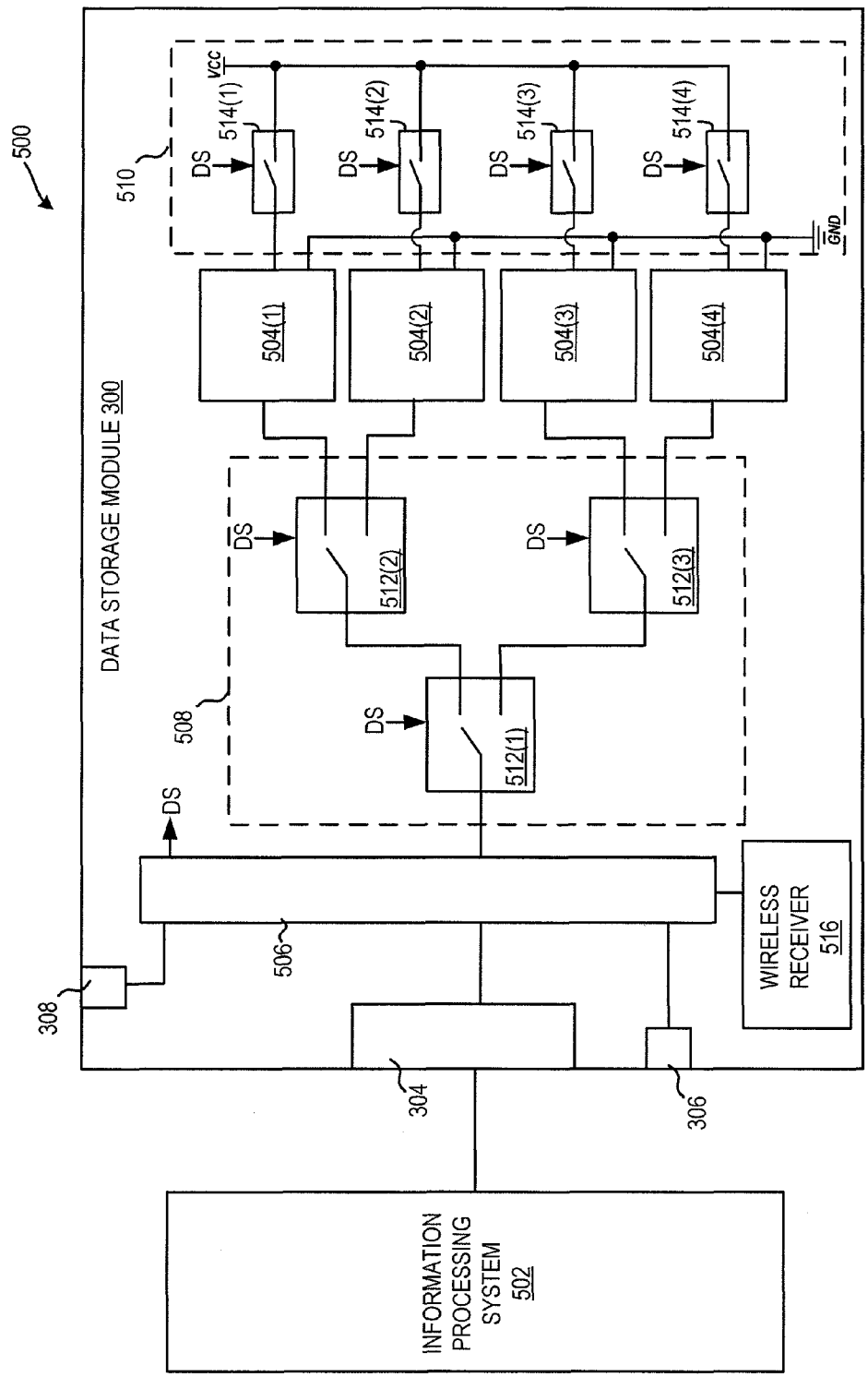
FIG. 5 is a block diagram of the components of the data storage module of FIG. 3, in one embodiment.
Figure 6:
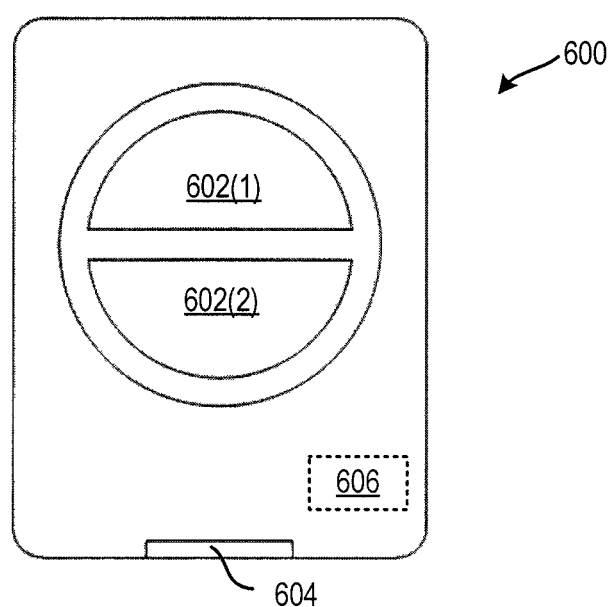
FIG. 6 depicts an exemplary wireless controller for controlling the data storage module of FIG. 3, in one embodiment.

FIG. 3 depicts a perspective view of a data storage module 300 having an outer casing 302, a data port 304, a configuration port 306, and a drive select interface 308 in one embodiment. FIG. 4 depicts a top view of the data storage module 300, of FIG. 3, further showing optional drive select interface 308 in more detail. FIG. 5 is a block diagram of the components of data storage module 300, of FIG. 3, in one embodiment. FIG. 6 depicts an exemplary wireless controller 600 for controlling data storage module 300, of FIG. 3, in one embodiment. FIGS. 3-6 are best viewed together with the following discussion.

Data storage module 300 is configured to be located within the housing of an information processing system. As used herein, information processing systems include laptop computers, desktop computers, servers, embedded systems, tablets, handhelds, wearables, etc. Data storage module 300 includes outer casing 302 configured to the size and shape of a first form factor. Form factor, as used herein, relates to the required specifications of an industry standard. For example, first form factor of outer casing 302 may be a solid-state drive (SSD) or hard disk drive (HDD) including the following example standards: PATA, SATA, SCSI, IEEE 1394, USB, Fibre Channel, Thunderbolt, and derivatives and variants of each.

Data storage module 300 further includes a data port 304 corresponding to the first form factor. In alternative embodiments, data port 304 may not correspond to first form factor, but instead may correlate to a different industry standard. For example, data port 304 may be a host bust adapter (HBA) of an industry standard such as: PATA, SATA, SCSI, IEEE 1394, USB, Fibre Channel, Thunderbolt, and derivatives and variants of each.

Data storage module 300 further includes a configuration port 306. Configuration port 306 may be used for a variety of functions discussed in further detail below with respect to FIG. 5. Configuration port 306 may be located on the housing of data storage module 300.

Alternatively, configuration port 306 may be discretely located as part of data port 304. Accordingly, data storage module 300 may be configured via connection through data port 304 including firmware/software updates, pairing with other devices (discussed below) and other functionality. Configuration may be completed via information processing system 502, or alternatively via a breakout board.

Figure 8:
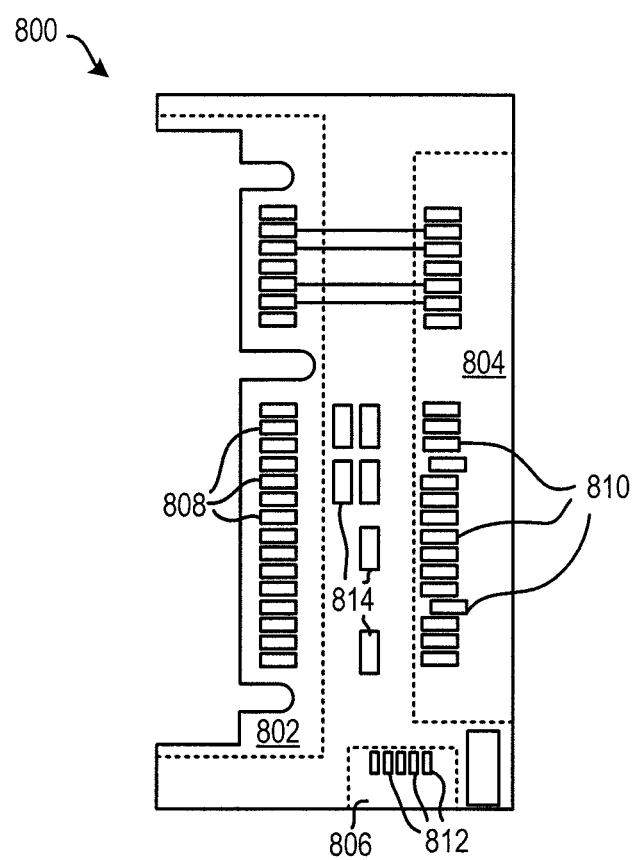
FIG. 8 depicts an exemplary breakout board for connection with a configuration port which is discretely located as part of the data port of FIG. 3, in one embodiment.

FIG. 8 depicts an exemplary breakout board 800 for connection with configuration port 306 which is discretely located as part of data port 304, of FIG. 3. Breakout board 800 includes a data storage module connection 802, an external power/data connection 804, and a USB connection 806. Data storage connection 802 includes a plurality of connectors 808 for coupling to a data storage module (e.g. data storage module 300). External power/data connector 804 includes a plurality of connectors 810 for coupling to any one or more of the information processing systems to which the data storage module operates with, power and/or ground connections. USB connection 806 includes a plurality of connectors 812 for coupling to a host computer via a USB cable. USB connection may further be used to connect to other devices, such as wireless controller 600, discussed below. Breakout board 800 may include various other indicators 814 indicating operation of one or more of information processing system, host computer, data storage module, or USB device connected to breakout board 800. In the exemplary embodiment of FIG. 8, data storage module connection is a SATA port, and external power/data connector 804 connects to power, ground, and optionally the information processing system. However, data storage module connection 802 may be a different industry standard, such as for example PATA, SATA, SCSI, IEEE 1394, USB, Fibre Channel, Thunderbolt, and derivatives and variants of each.

Breakout board 800 serves to couple a host computer connected to breakout board 800 via USB device port 806 to a data storage module connected to data storage connection 802. However, breakout board 800 allows the data storage module to not have a physical configuration port (i.e. configuration port 306) on the housing thereof. Instead, the host computer connected to USB device port 806 may include software or firmware, such as a terminal software program, to enable configuration of the data storage module attached to data storage connection 802.

External power/data connector 804 is coupled to the data storage medium connection 802, to provide necessary power requirements for operating the data storage module when connected to breakout board 800. It should be appreciated that connection to external power/data connector 804 is optional if the data storage medium can be powered solely from the device (e.g. a host computer) connected to USB port 806. In one example of use of breakout board 800, only power and ground are connected to external power/data connector 804 to provide required power to operate the data storage module when connected to the data storage connector 802. In another example of use of breakout board 800, the information processing system may only be connected to external power/data connector 804 when information thereof is required during configuration using breakout board 800. It should be appreciated that the breakout board 800 can also act as an intermediate connection between the data storage module and the information processing system to allow communication there between and not just for configuration of the data storage module.

To configure the data storage module connected to the data storage module connector 802, a terminal program may run on host computer connected to host connection 804. The terminal program may provide the desired interface to alter the configuration of the data storage module. Such configuration may be identification of a boot up drive within data storage module (i.e. data storage module 300), or also pairing with a wireless controller (i.e. wireless controller 600, discussed below). More configuration options are discussed below.

Data storage module 300 optionally includes a drive select interface 308. Drive select interface 308 includes a plurality of actuators/indicators 402 indicating operation of data storage module 300. Additional details of drive select interface are discussed below with respect to FIG. 5. In some embodiments, the interface 308 may not be seen from outside the casing 302.

As is illustrated by block diagram 500 of FIG. 5, information processing system 502 is coupled to data storage module 300 via data port 304. Within data storage module 300 are two or more data storage mediums 504(1)-504(4) and a processor 506 configured to control operation of a drive select switching circuit 508 and a power select switching circuit 510. Although illustrated as having four data storage mediums 504(1)-504(4), it should be appreciated that data storage module 300 may include more or fewer (so long as there are two or more) data storage mediums therein. Data storage mediums 504 may be of the same industry standard as first form factor, or alternatively may be of a different industry standard. For example, first form factor may be a 7 mm thick, 2.5 inch SATA drive enclosing two mSATA data storage mediums. Alternatively, first form factor may be a 9.5 mm thick, 2.5 inch SATA drive enclosing four mSATA data storage mediums. Further, first form factor may be mSATA, and the industry standard of the data storage mediums may be M.2. Other variations of first form factor industry standard to industry standard of data storage mediums 504 are also possible. In some embodiments, it may be particularly preferred that the data storage mediums 504 are of different industry standard than the form factor; this may result in the data storage module being different than what it appears to be.

Drive select switching circuit 508 includes a plurality of drive select switches 512(1)-512(3). More or fewer drive select switches 512 may be used according to the number of data storage mediums 504. Processor 506 is configured (e.g. by executing non-transitory computer readable instructions such as firmware) to generate a drive select signal (DS). Drive select signal DS controls configuration of each of drive select switches 512 such that a data path is formed from information processing system 502 to one of data storage mediums 504. Drive select signal DS may be such that only one data storage medium 504 is accessible by information processing system 502 at any given moment, or such that some or all of data storage mediums 504 are accessible at any given moment.

Power select switching circuit 510 includes a plurality of power select switches 514(1)-514(4). More or fewer power select switches 514 may be included according to the number of data storage mediums 504. Drive select signal DS (either the same drive select signal, or a second drive select signal different than drive select signal for drive select switches 512) may control configuration of each of power select switches 514 such that only one of data storage medium 504 is powered at any given moment. This provides many advantages such as power saving, and inability for data storage medium 504 to be visible via inspection through the operating system running on information processing system 502 thereby providing improved data security. It should be appreciated that although power select switches 514 are shown between a common voltage (VCC) and the data storage modules 504, alternate configurations are possible. For example, power select switches 514 may be between a common ground. Alternatively, power select switching circuit 510 may be configured such that each data storage medium 504 does not have a common VCC (or a common GND), but instead has specific power supply characteristics as desired.

Data storage module 300 further includes a wireless receiver 516. Wireless receiver 516 is configured to receive a signal from a wireless controller to identify a data storage medium 504 to activate. FIG. 6 depicts an exemplary wireless controller 600. Wireless controller 600 is a keyfob configuration that wirelessly transmits via one or more of magnetic, radio frequency, Bluetooth, near field communication, or Wi-Fi. Wireless controller 600 includes a button 602(1), 602(2), corresponding to each of the data storage modules. Wireless controller 600 is shown for an embodiment of data storage module 300 having two internal data storage mediums 504. Wireless controller 600 further includes a port 604 for coupling with configuration port 306 of data storage module 300, and potentially charging of an internal battery. Wireless controller 600 may further include an authentication means 606. Authentication means may be any method of authentication performed on wireless controller 600 required to activate selection via buttons 602. For example, authentication means 606 may be a PIN code entry, physical lock, bio-authentication such as voice, finger print, eye scanner, etc. In order to select a data storage medium 504 to activate, the user may be required to satisfy authentication means 606, and then press one of buttons 602. Alternatively, authentication means 606 may be a required pattern of buttons 602 to be pressed, and then selection of the button 602 representing the desired data storage medium 504.

Accordingly, in such embodiment, wireless receiver 516 includes the same communication standard as wireless controller 600. Alternatively, wireless receiver 516 may be a cellular module, and wireless controller may be a mobile device running a secure application for selecting the activated data storage medium 504. In yet another embodiment, wireless receiver 516 is a GPS module such that one or more data storage mediums 504 are activated or otherwise accessible to information processing system 502 when the data storage module 300 is in a specific location. In yet another embodiment, wireless receiver 516 includes a reed switch and wireless controller 600 is a magnet such that one or more data storage mediums 504 are activated or otherwise accessible to information processing system 502 when the magnetic wireless controller comes within a certain proximity to the wireless receiver.

Wireless receiver 516 is coupled to processor 506, such that upon receipt of a drive activation signal from wireless controller (discussed above), processor 506 generates drive select signal DS to activate the desired data storage medium. Accordingly, data storage mediums may be configured to be hot-swappable. In other words, data storage mediums 504 may be able to be activated without shutting down information processing system 502.

Configuration port 306 may serve a variety of purposes. For example, configuration port 306 may be a maintenance port for updating the firmware of processor 506. Alternatively, configuration port 306 may couple to the wireless controller 600 such that wireless receiver 516 may be paired with the wireless controller. It should be appreciated, however, that wireless receiver 516 and wireless controller 600 may be paired wirelessly without physical connection to configuration port 306.

Including wireless receiver 516 provides the advantage that data storage module 300 may have the appearance of only a single drive, but instead includes a plurality of individual data storage mediums that are isolated from each other. Additionally, module 300 may be installed in an information processing system 502 without requiring physical access to the module 300 when installed (e.g. via bay door 18, discussed above with respect to FIG. 1). Selection of the activated data storage medium 504 is controlled in response to wireless controller, as opposed to a physical switch.

In certain embodiments, however, both a drive select interface 308 and wireless receiver 516 are included. Drive select interface 308 may include indicators, and/or activators for controlling operation of data storage module 300 in addition to wireless receiver 516. For example, indicators on drive select interface 308 may indicate that the wireless controller is paired, that wireless receiver is in a pairing mode, that wireless receiver is enabled, and/or a boot indication of the data storage module.

Additionally, drive select interface may include activation switches for selecting the activated drive. In one embodiment, the activation switches indicate which drive to automatically boot upon startup of information processing system 502. However, the function of boot data storage medium may be performed without drive select interface 308. This is particularly important when it is desired to have the visual look and feel of the data storage module not indicate multiple storage mediums. For example, wireless controller and wireless receiver 516 may be used to select a boot data storage medium that activates upon startup of information processing system 502. In one example of operation, wireless controller is coupled to configuration port, and then a signal is received from wireless controller indicating a boot data storage medium. Alternatively, the data storage module may be configured to automatically boot to the last selected drive.

Further yet, processor 506 may be configured with firmware that requires a keystroke on the keyboard of information processing system 502 to select the desired boot drive. If no keystroke is received, then processor 506 utilizes the default, or pre-selected, boot drive. For example, the firmware may be a micro-Linux or micro-DOS environment executed on the processor 506 which waits for a keystroke. Also, the keystroke may initiate a configuration mode within the firmware such that the data storage module can be configured directly from the information processing system 502 without the use of a breakout board (i.e. breakout board 800).

In another example of operation, wireless receiver 516 receives a signal from wireless controller without being coupled to configuration port (either through a button on the wireless controller being pressed for a given amount of time, or through an indication from mobile device). The received signal is then processed by processor 506 to configure drive select signal DS upon startup of information processing system 502.

Processor 506 may be configured to control access to the data storage mediums in accordance with a large volume management protocol. For example, the data storage mediums may be used in accordance with a redundant array of inexpensive disks (RAID) protocol. Additionally, processor 506 may be configured to utilize one of the data storage mediums as a local back-up drive such that electronic data from one or more of the data storage mediums other than the local back-up drive is automatically copied to the local back-up drive. This provides many advantages. For example, the back-up drive is local, and thus cloud storage which can easily be hacked into is not necessary to back-up sensitive data. Further, where the data storage module 300 looks like only a single drive, the local back-up drive is not readily apparent, and thus sensitive data can be stored and backed-up on the local storage drive in a secure manner where only the owner of the drive has knowledge of its existence.

Data storage module 300 may further include tamper prevention means such that each individual drive is tamper resistant. Tamper prevention may be software driven, such as a firmware module performed by processor 506, or a firmware module specifically associated with each individual data storage medium 504. Alternatively, tamper prevention means may be hardware driven, such as an explosive device, heat device, electronic current, or magnetic device, or mechanical force applying device. In certain embodiments, each data storage medium is physically and electronically isolated from each other such that tamper prevention means only zeroize or erase data on individual ones of the data storage mediums without affecting the data on other data storage mediums. This is particularly useful where the form factor of the data storage module is such that upon inspection of the data storage module, it appears that there is only one data storage medium therein. Thus, once tamper prevention means is activated for one of the plurality of data storage mediums, the intruder is discouraged from such intrusion as the intruder is led to believe that the entire drive is compromised and/or destroyed.

Figure 7:
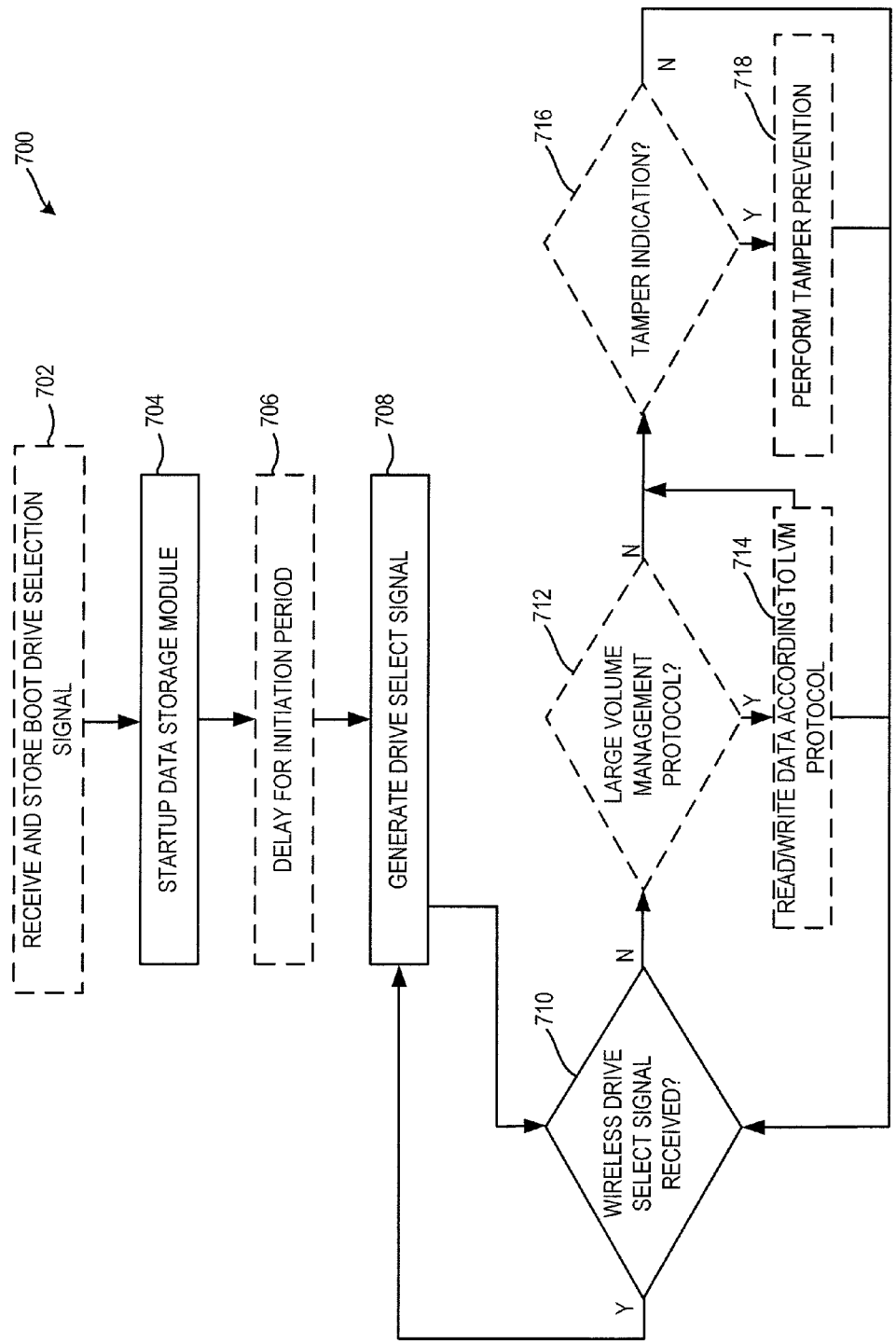
FIG. 7 depicts an exemplary method for operating a data storage module having two or more data storage mediums therein, in one embodiment.

FIG. 7 depicts an exemplary method 700 for operating a data storage module having two or more data storage mediums therein, in one embodiment. Method 700 is for example implemented as non-transitory computer readable instructions executable by processor 506 of data storage module 300.

In optional step 702, method 700 receives and stores a boot drive selection signal. In one example of step 702, boot drive selection signal is a signal from drive select interface 308. In another example of step 702, boot drive selection signal is received via a wireless controller coupled to configuration port 306 of data storage module 300. In another example of step 702, boot drive selection signal is a signal received at processor 506 from wireless receiver 516 in response to a wireless signal from wireless controller.

In step 704, method 700 initiates startup of data storage module 300. In one example of operation, startup of data storage module is initiated upon startup of information processing system 502.

In optional step 706, method 700 delays for a predetermined time to receive a signal from wireless receiver 516 of initial data storage module 504 for information processing system 502 to have access. Thus, upon startup of information processing system 502, the user may press a button on the wireless controller to send a signal to wireless receiver 516 indicating which data storage module 504 to have initial access to.

In step 708, method 700 generates a drive select signal. In one example of operation of step 708, processor 506 generates drive select signal DS to control one or both of drive select circuit 508 and power select circuit 510 to provide access to a single one of data storage mediums 504. If step 702 is included, the first instance of step 708 may generate a drive select signal DS according to boot selection signal. If step 706 is included, step 708 may generate a drive select signal DS according to the signal received during the initiation delay period.

Step 710 is a decision. If in step 710 a wireless drive select signal is received, method 700 repeats step 708. If no signal is received, method 700 continues to either steps 712 or 716, if included. In one example of step 710, wireless receiver 516 receives a wireless drive select signal and relays the signal to processor 506. In turn, processor 506 repeats step 708 to generate a new drive select signal.

Step 712 is an optional decision. Step 712 is performed if data storage module 300 is configured to store data within each of the data storage modules 504 according to a large volume management protocol. If, at step 712, data storage module 300 receives data from, or a request for data from, information processing system 502 to be stored within data storage mediums 504 according to the large volume management (LVM) protocol, method 700 proceeds to step 714. In step 714, method 700 reads or writes the data according to the large volume management protocol. In one example of operation, processor 506 receives a data read/write request from information processing system 502 and responds by reading/writing data to/from the data storage mediums according to a redundant array of inexpensive disks (RAID) protocol. In another example of operation of step 714, where one of the data storage modules 504 is configured as a local back-up drive, as discussed above, data is copied from one or more of the data storage modules to the local back-up drive. Upon completion of step 714, method 700 either returns to check for a wireless drive select signal at step 710, or performs a detection for tampering in step 716.

Step 716 is an optional decision. In step 716, method 700 determines if there is a tamper indication. In one example of operation, processor 506 includes tamper prevention firmware for identifying if an unauthorized user is attempting to gain access to electronic data stored thereon. Based upon a tamper indication in step 716, method 718 performs tamper prevention. In one example of step 718, data storage module 300 includes tamper prevention means such as an explosive device, heat device, electronic current, or magnetic device, or mechanical force applying device configured to erase or destroy electronic data stored on one or all of the data storage mediums 504. If no tamper indication is found, method 700 repeats steps 710 and/or 712 to form a processing loop.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An electronic data storage device having two or more configurable data storage mediums, comprising:
    an outer casing having a single data port, an appearance that there is only one data storage medium therein, and a form factor configured to mount within an information processing system; the two or more data storage mediums located within the outer casing; each of the data storage mediums being physically and electronically isolated from each other of the data storage mediums; the single data port being coupled with the information processing system;
    a processor configured to control operation of each of the data storage mediums such that the information processing system has access to an activated one of the data storage mediums at a given moment; and
    a wireless receiver, coupled with the processor, for receiving a signal from a wireless controller to identify the activated one of the data storage mediums.

2. The electronic data storage device of claim 1, further comprising:
    a drive select switching circuit for coupling the single data port to the activated one of the data storage mediums; and
    a power select switching circuit for coupling each of the one or more data storage mediums to power;
    wherein the processor is configured to control operation of each of the data storage mediums by generating one or more drive select signals, the one or more drive select signals controlling the drive select switching circuit and the power select switching circuit.

3. The electronic data storage device of claim 2, the power select switching circuit comprising a plurality of power select switches; wherein the one or more drive select signals are configured to control the plurality of power select switches such that only the activated one of the data storage mediums is powered.

4. The electronic storage device of claim 2, the drive select switching circuit comprising a plurality of drive select switches; wherein the one or more drive select signal is configured to control the drive select switches such that only the activated one of the data storage mediums is coupled to the single data port at the given moment.

5. The electronic data storage device of claim 1, further comprising a configuration port, on the outer casing, coupled to the processor.

6. The electronic data storage device of claim 5, the processor further configured to pair the wireless receiver with the wireless controller when the wireless controller is in data communication with the configuration port.

7. The electronic data storage device of claim 5, the processor further configured to at least one of:
    select one of the data storage mediums as a boot data storage medium based upon a boot indicator received via the configuration port;
    select one of the data storage mediums based on a keystroke received at the information processing system.

8. The electronic data storage device of claim 1, the wireless controller having a plurality of buttons corresponding to the number of data storage mediums; and the wireless receiver and the wireless controller communicating via one or more of magnetism, radio frequency, Bluetooth, near field communication, or Wi-Fi.

9. The electronic data storage device of claim 1, wherein at least one of:
- the wireless receiver is a cellular receiver and the wireless controller is a mobile device;
- the wireless receiver is a GPS receiver such that the activated one of the data storage modules is selected based on location; and
- the wireless receiver includes a magnetic reed switch, and the wireless controller includes a magnet such that the activated one of the data storage modules is selected based on proximity of the magnet to the magnetic reed switch.

10. The electronic data storage device of claim 1, further comprising a drive select interface located on the outer casing for selecting the activated data storage medium.

11. The electronic data storage device of claim 10, the processor further configured to select one of the data storage mediums as a boot data storage medium based upon the drive select interface.

12. The electronic data storage device of claim 1, wherein the data storage mediums are accessed by the information processing system via a large volume management protocol.

13. The electronic data storage device of claim 12, wherein the large volume management protocol is a redundant array of inexpensive disks (RAID) protocol.

14. The electronic data storage device of claim 1, one of the two or more data storage mediums being a local back-up drive; wherein electronic data from at least one of the data storage mediums other than the local back-up drive is automatically copied to the local back-up drive.

15. The electronic data storage device of claim 1, wherein each of the data storage mediums are hot-swappable.

16. The electronic data storage device of claim 1, the form factor being configured to a first industry standard such that the number of data storage mediums within the outer casing are not apparent upon inspection of the electronic data storage device.

17. The electronic data storage device of claim 1, each of the two or more data storage mediums being individually tamper resistant.

18. The electronic data storage device of claim 16, the data storage mediums being configured to a second industry standard different from the first industry standard.

19. The electronic data storage device of claim 18, the first industry standard being serial advanced technology attachment (SATA), and the second industry standard being mini serial advanced technology attachment (mSATA).

20. The electronic data storage device of claim 18, the first industry standard being mini serial advanced technology attachment (mSATA), and the second industry standard being M.2.

21. An electronic data storage device having two or more configurable data storage mediums, comprising:
- an outer casing having a single data port, an appearance that there is only one data storage medium therein, and a form factor configured to mount within an information processing system; the two or more data storage mediums located within the outer casing; each of the data storage mediums being physically and electronically isolated from each other of the data storage mediums; the single data port being coupled with the information processing system; and
- a processor configured to control operation of each of the data storage mediums such that the information processing system has access to an activated one of the data storage mediums at a given moment;
- wherein the form factor is configured to a first industry standard such that the number of data storage mediums within the outer casing is not apparent upon inspection of the electronic data storage device.

22. The electronic data storage device of claim 21, further comprising:
- a drive select switching circuit for coupling the single data port to the activated one of the data storage mediums; and
- a power select switching circuit for coupling each of the one or more data storage mediums to power;
- wherein the processor is configured to control operation of each of the data storage mediums by generating one or more drive select signals, the one or more drive select signals controlling the drive select switching circuit and the power select switching circuit.

23. The electronic data storage device of claim 22, the power select switching circuit comprising a plurality of power select switches; wherein the one or more drive select signals are configured to control the plurality of power select switches such that only the activated one of the data storage mediums is powered.

24. The electronic storage device of claim 22, the drive select switching circuit comprising a plurality of drive select switches; wherein the one or more drive select signal is configured to control the drive select switches such that only the activated one of the data storage mediums is coupled to the single data port at the given moment.

25. The electronic data storage device of claim 21, further comprising a configuration port, on the outer casing, coupled to the processor.

26. The electronic data storage device of claim 25, further comprising a wireless receiver, coupled with the processor, for receiving a signal from a wireless controller to identify the activated one of the data storage mediums; and the processor further configured to pair the wireless receiver with the wireless controller when the wireless controller is in data communication with the configuration port.

27. The electronic data storage device of claim 25, the processor further configured to at least one of:
- select one of the data storage mediums as a boot data storage medium based upon a boot indicator received via the configuration port;
- select one of the data storage mediums based on a keystroke received at the information processing system.

28. The electronic data storage device of claim 21, further comprising a wireless receiver, coupled with the processor, for receiving a signal from a wireless controller to identify the activated one of the data storage mediums.

29. The electronic data storage device of claim 28, the wireless controller having a plurality of buttons corresponding to the number of data storage mediums; and the wireless receiver and the wireless controller communicating via one or more of magnetism, radio frequency, Bluetooth, near field communication, or Wi-Fi.

30. The electronic data storage device of claim 28, wherein at least one of:
- the wireless receiver is a cellular receiver and the wireless controller is a mobile device;
- the wireless receiver is a GPS receiver such that the activated one of the data storage modules is selected based on location; and
- the wireless receiver includes a magnetic reed switch, and the wireless controller includes a magnet such that the activated one of the data storage modules is selected based on proximity of the magnet to the magnetic reed switch.

31. The electronic data storage device of claim 28, further comprising a drive select interface located on the outer casing for selecting the activated data storage medium.

32. The electronic data storage device of claim 31, the processor further configured to select one of the data storage mediums as a boot data storage medium based upon the drive select interface.

33. The electronic data storage device of claim 21, wherein the data storage mediums are accessed by the information processing system via a large volume management protocol.

34. The electronic data storage device of claim 33, wherein the large volume management protocol is a redundant array of inexpensive disks (RAID) protocol.

35. The electronic data storage device of claim 21, one of the two or more data storage mediums being a local back-up drive; wherein electronic data from at least one of the data storage mediums other than the local back-up drive is automatically copied to the local back-up drive.

36. The electronic data storage device of claim 21, wherein each of the data storage mediums are hot-swappable.

37. The electronic data storage device of claim 21, each of the data storage mediums being individually tamper resistant.

38. The electronic data storage device of claim 21, the data storage mediums being configured to a second industry standard different from the first industry standard.

39. The electronic data storage device of claim 38, the first industry standard being serial advanced technology attachment (SATA), and the second industry standard being mini serial advanced technology attachment (mSATA).

40. The electronic data storage device of claim 38, the first industry standard being mini serial advanced technology attachment (mSATA), and the second industry standard being M.2.

41. An electronic data storage device having a plurality of configurable data storage mediums, comprising:
an outer casing having a single data port, an appearance that there is only one data storage medium therein and a form factor configured to mount within an information processing system; the form factor being configured to a first industry standard;
the plurality of data storage mediums located within the outer casing, each of the data storage mediums being physically and electronically isolated from each other of the data storage mediums, each of the data storage mediums being configured different from the first industry standard such that the number of data storage mediums is not apparent from the outer casing form factor; and
a processor configured to control operation of each of the plurality of data storage mediums such that the information processing system has access to an activated one of the data storage mediums at a given moment.

42. The electronic data storage device of claim 41, wherein each of the data storage mediums is configured to a second industry standard.

43. The electronic data storage device of claim 42, the first industry standard being serial advanced technology attachment (SATA), and the second industry standard being mini serial advanced technology attachment (mSATA).

44. The electronic data storage device of claim 42, the first industry standard being mini serial advanced technology attachment (mSATA), and the second industry standard being M.2.

* * * * *